(12) United States Patent
Dollens

(10) Patent No.: US 8,050,795 B2
(45) Date of Patent: Nov. 1, 2011

(54) CONVEYOR DRIVE CONTROL SYSTEM

(75) Inventor: Donald Dollens, Grosse Pointe Shores, MI (US)

(73) Assignees: Donald L. Dollens, Madison Heights, MI (US); Linda E. Neumann, Madison Heights, MI (US)

( * ) Notice: Subject to any disclaimer, the term of this patent is extended or adjusted under 35 U.S.C. 154(b) by 1229 days.

(21) Appl. No.: 11/725,662

(22) Filed: Mar. 20, 2007

(65) Prior Publication Data
US 2008/0234858 A1 Sep. 25, 2008

(51) Int. Cl.
*G06F 7/00* (2006.01)
(52) U.S. Cl. .......................... 700/230; 198/571; 198/334
(58) Field of Classification Search .................. 700/230, 700/228, 213; 198/571, 572, 575, 577, 579, 198/461.1, 334, 341.03, 341.09, 444, 459.8; 318/400.07, 400.15, 432
See application file for complete search history.

(56) References Cited

U.S. PATENT DOCUMENTS

| | | | |
|---|---|---|---|
| 4,957,532 A * | 9/1990 | Jacobson et al. ................. | 65/273 |
| 5,004,094 A * | 4/1991 | Brandt ....................... | 198/460.1 |
| 6,065,583 A * | 5/2000 | Hoashi et al. ................. | 198/334 |
| 6,554,189 B1* | 4/2003 | Good et al. .............. | 235/462.01 |
| 6,701,214 B1 | 3/2004 | Wielebski et al. | |
| 6,873,882 B2 | 3/2005 | Tachibana et al. | |
| 6,897,625 B2* | 5/2005 | Brixius et al. .................. | 318/69 |
| 6,959,804 B2* | 11/2005 | Helgerson et al. ............ | 198/805 |
| 7,007,807 B1 | 3/2006 | Stockard | |
| 7,035,714 B2 | 4/2006 | Anderson et al. | |
| 7,050,873 B1 | 5/2006 | Discenzo | |
| 7,081,735 B1 | 7/2006 | Malkowski, Jr. et al. | |
| 7,331,210 B2* | 2/2008 | Dietrich ........................ | 73/1.13 |
| 2001/0027909 A1* | 10/2001 | Itoh et al. ..................... | 198/788 |
| 2002/0111711 A1* | 8/2002 | Peshkin et al. ............... | 700/230 |
| 2003/0116408 A1* | 6/2003 | Topmiller et al. ........ | 198/781.05 |
| 2004/0134754 A1* | 7/2004 | Grafer et al. ............... | 198/465.1 |
| 2005/0283273 A1* | 12/2005 | Keras et al. ................... | 700/239 |

* cited by examiner

*Primary Examiner* — Ramya Prakasam
(74) *Attorney, Agent, or Firm* — Rader Fishman & Grauer; Douglas P. LaLone

(57) ABSTRACT

A drive control system for conveyor utilizes a dynamic chain pull calculation program that is integrated with a PLC, which communicates to a plurality of controllers. The controllers in turn automatically adjust their associated drive motors so as to maximize efficiency at moving material on a conveyor system. Sensing devices provide continuous load parameters to a PLC that in turn, processes the data and adjusts the system's operation based upon desired conditions.

21 Claims, 3 Drawing Sheets

CONVEYOR DRIVE CONTROL SYSTEM

FIELD OF THE INVENTION

A drive control system for use in connection with a conveyor that can be used in a manufacturing operation, more specifically, a dynamic conveyor drive control system that employs a mathematical model to effectuate delivery of balanced power and speed control of a material handling system so as to maximize efficiency of moving work material throughout a production facility.

BACKGROUND AND SUMMARY OF THE INVENTION

It is well known to provide a conveyor to move material throughout a plant. In many instances, electric motors are utilized to drive a chain which in turn is routed throughout a manufacturing line or plant so as move a part (load) along a predetermined path. The weight of the load(s) to be carried by a conveyor system are normally predetermined and are factored into a formula for ascertaining the torque requirements for a given drive motor or set of drive motors that are required to move all anticipated loads at a given speed. Sensing devices such as limit switches or proximity switches are often used to monitor and effectuate the control of the movement of loads along the established conveyor path. The loads are typically supported and carried by an element of the conveyor mechanical system commonly called a "carrier".

A common type of conveyor system is a monoveyor which can transport a load or series of loads on carriers that are directly attached to the chain of the conveyor system. Another common type of chain conveyor is a "power & free" system. As with the monoveyor systems, the primary moving element is a chain, however, in this case the chain is utilized to push detached carriers along the path of the conveyor. These detached carriers are located in a separate "free rail". Mechanisms along the pathway of the conveyor allow the carrier to disengage, stop, and switch to different pathways of the conveyor system. The load in either of these systems can be a work piece that needs to be delivered to various work stations in order for particular operations to be performed such as machining, and once machined, the work piece continues on the conveyor to the next station. Multi-drive systems are commonly used to deliver power and movement to these conveyors.

The problem however is that traditional multi-drive systems do not compensate well under all conditions for the changes in torque demand as loads advance along the conveyor line. This may cause the drive motor in any given zone along the conveyor line to operate inefficiently. For example, a drive motor at a particular zone that is temporarily carrying a substantial portion of the total load could be under performing by not producing sufficient torque output so as to move the work piece given the dynamic conditions of the conveyor line. By contrast, a different drive motor in another zone that is temporarily carrying very little load could be over performing and producing too much torque output thus causing the conveyor chain and thus the carriers and loads to advance along the conveyor line erratically. This inconsistency amongst the zones can also cause undue stress on the components of the conveyor.

One method of determining the amount of torque required to be produced by a given motor or group of motors so as to properly advance a work piece on a conveyor under all expected conditions is to use a mathematical model commonly referred to as a chain pull calculation. Typically, a chain pull calculation is a static mathematical model that is utilized during the design phase of a chain conveyor. Once the pathway of the system is determined and the speed and load requirements are established, a series of static chain pull calculations are completed. Each static calculation is carried out with conveyor loads shown at various potential positions on the system. These calculations are also used to determine the optimal power delivery as well as location of the drive or drives along the path of the conveyor. When the model is utilized, drives are typically located and sized such that motors of equal horsepower are placed along the chain path. In essence, final placement and sizing of drives is based upon this mathematical model of the conveyor mechanical system and the limits imposed by the conveyor pathway that is determined in order to perform the work anticipated by that design.

Presently, a number of control technologies are employed to allow multi-drive systems to perform the required work. All systems rely to some degree on motor "slip" to balance the relative torque demands during operation. Some systems utilize torque feedback techniques to adjust individual motor torque outputs. In any case, the individual drive control systems "react" to the imposed load conditions. For this reason, chain conveyors are designed with the limitations imposed by reactive drive systems in mind. With the current available technologies employed, the longer the chain and the greater the quantity of drives utilized in a multi-drive system, the higher the likelihood of erratic performance. Therefore multi-drive conveyors are avoided when possible. The present invention overcomes this problem.

A recognized "rule of thumb" in the conveyor industry is to limit the total length of chain in any single continuous chain system to 2000 feet. This is primarily due to the stress imposed on the chain and mechanical guide components by the build up of "chain tension" that partially occurs as a result of the standard practice of maintaining a taut chain. This chain tension tends to increase, in general, as the length of the chain is increased. The chain is kept relatively taut to avoid mechanical jamming or binding and or erratic fluctuations in chain speed sometimes referred to as "surge" due to the effect of uncontrolled chain "telescoping" when proper chain tension is not maintained. Operational irregularities can result due to chain speed inconsistencies that can affect both manual and automatic systems interfacing with the conveyor and in some cases can present a safety hazard or cause negative quality impacts on product within a plant or conveyor line.

Therefore, it would be desirable to provide a conveyor drive control system that overcomes the aforementioned problems. The preferred system should be dynamic and operable to constantly change performance output of every motor within the system, in view of the constantly changing loads on the system. It would also be desirable to provide a drive control system that improves the available technology such that torque demands on the drive system are anticipated and proactively met, speed requirements are maintained, and in addition, total continuous chain length may be effectively increased well beyond the 2000 foot limitation so as to accommodate the total length of the work zone of the conveyor.

It would also be desirable to provide an improved drive control system for a multi-drive system that continuously senses the position and weight of a load or loads as they travel about the system, sends that information to a computer which in turn calculates torque requirements for each drive within the system, and then sends a corresponding signal back to a drive controller for producing the proper torque output for each drive within the materials handling a system.

It would also be desirable to provide an improved drive control system that improves delivery of balanced power and speed control throughout the multi-drive material handling system. It would also be beneficial to increase the work efficiency of these systems by reducint the amount and weight of the "return chain" of power & free systems, extending the total work length of the chain, as well as a reduction in the total number of drives required to move all loads along the path of the conveyor system so as to provide cost savings.

It will be appreciated that the improved drive control system can be employed with many types of conveyors where multiple motors are used to move one or more loads throughout a manufacturing line.

One aspect of the present invention provides a drive control system for a conveyor comprising one or more variable speed motors for driving a conveyor device. A dynamic chain pull calculation program is operable to continuously calculate the torque requirements for each motor in the system. One or more sensors are employed that are operable to create a signal indicative of a load transiting a designated zone and, if required, additional data including the weight of such a load or loads, and send data to a PLC. The PLC then converts the data from each sensor and transmits a signal to a computer operating the dynamic chain pull calculation program. A computer is operable to process the signal from the PLC using the dynamic chain pull calculation program and in turn generates real time drive torque data for each motor. A motor controller is operable to control each variable speed motor within the system so that the proper torque is generated by each motor as is required for optimum performance. The resulting drive control system is dynamic and continuously monitors torque requirements for each motor within the system given current load data so as to maximize efficiency of the conveyor.

Further areas of applicability of the present invention will become apparent from the detailed description provided herein. It should be understood that the detailed description and specific examples, while indicating preferred embodiments of the present invention, are intended for purposes of illustration only, since various changes and modifications within the spirit and scope of the invention will become apparent to those skilled in the art from this detailed description. It will be appreciated that the present invention can be utilized in a variety of converyor systems, and where it is desirable to efficiently transport materials through a plant or facility.

DETAILED DESCRIPTION OF THE PREFERRED EMBODIMENTS

Figure 1:
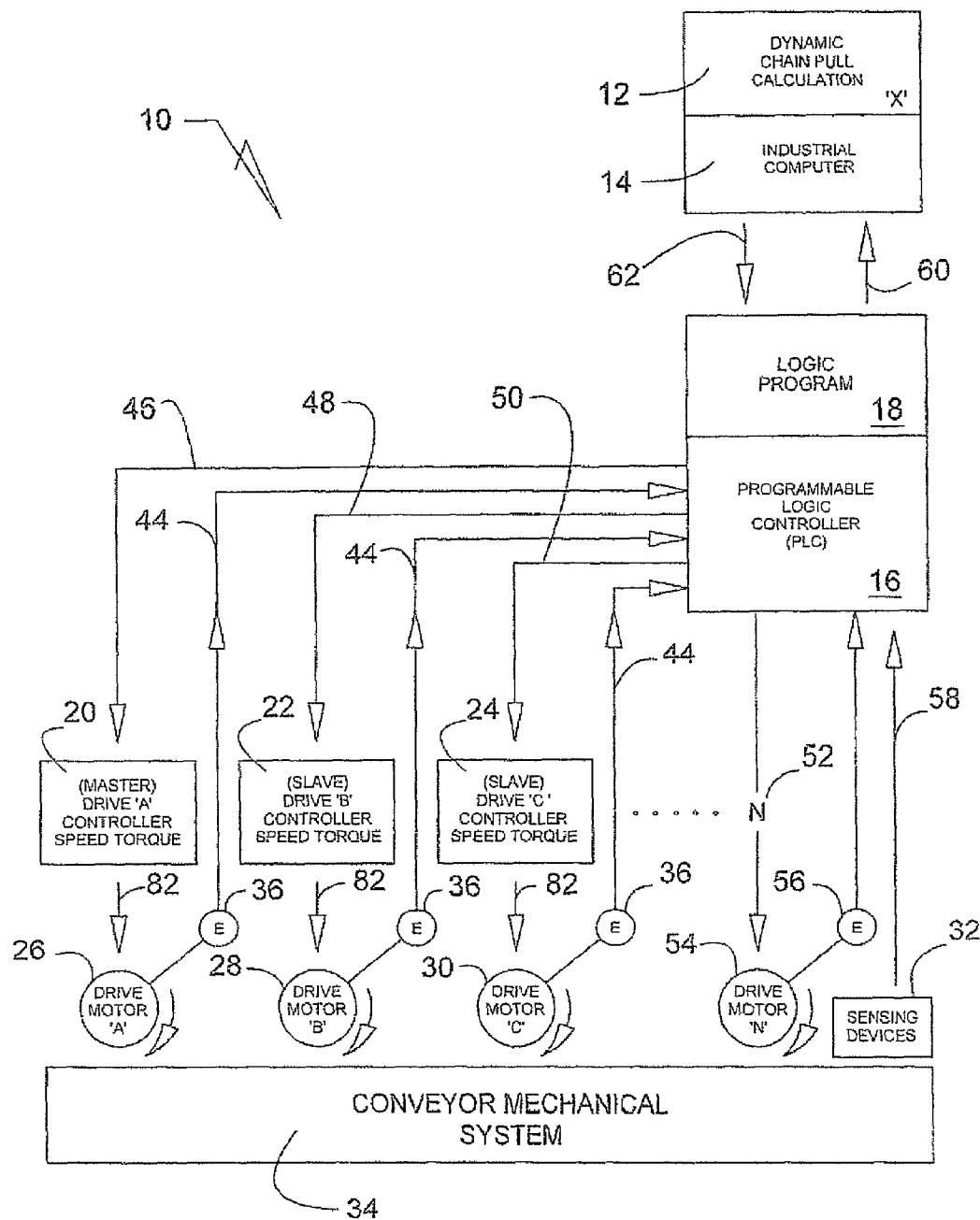
FIG. 1 illustrates a flow diagram for a conveyor drive control system.

A drive control system 10 is illustrated in FIG. 1 and includes a dynamic chain pull calculation computer software program 12, and industrial computer 14, a PLC 16 with software 18, a plurality of drive controllers 20, 22 and 24, a plurality of drive motors 26, 28 and 30 and sensing devices 32. The drive control system 10 is integrated with a conveyor 34 which includes typical components for moving work pieces throughout an assembly line. It will be appreciated that the present drive control system 10 can be utilized wherever it is desired to dynamically control the movement of material from place to place.

With continued reference to FIG. 1, an individual encoder 36 is places in proximity to drive motors 26, 28 and 30 for counting and monitoring the links 38 that comprise a conveyor or chain 40. The conveyor chain can be in excess of the 2,000 ft. limitation that is typically ascribed to chain conveyor applications. Through utilization of the encoders 36, the specific number of chain links between drive motors can be constantly monitored and such data processed by the PLC 16. The rotational angle of all encoders is continually measured by increments and is returned to the control system via signal 44. These signals are compared to incremental measurements coming from other drive related encoders within the control system. The incoming incremental data is utilized to cause the control system to respond in such a way as to adjust the relative speed of each drive so that the number of chain links within the defined zone between drives remains constant. The synchronizing function of this system in this manner will assure that some amount of induced slack chain is maintained between all drive points.

The PLC 16 includes software 18 for converting the data from the sensing devices 32. This data in turn is processed by the industrial computer 14 so as to identify all carriers or loads transiting various predefined zones as well as the weight characteristics of each carrier and load on the conveyor 34. The logic software program 18 also processes the encoder data 44 that is conveyed to the PLC 16. The encoder data 44 would include, inter alia, the number of links counted as they exit the preceding zone and enter the succeeding zone of primary drive zones.

It will be appreciated that the PLC 16 itself can control the speed adjustments of the slave drive controllers 22 and 24 individually without the aid of the computer 14. Likewise, the present system could be configured to exclude the PLC 16 and instead have the computer 14 process and output the signals to thee controllers 20, 22 and 24. Torque output signal 46 traverses from the PLC 16 to the master controller 20. A second torque requirement output signal 48 comes from controller 16 and is delivered to a slave drive controller 22. A third torque output signal 50 is communicated from controller 16 to another slave drive controller 24. It will be appreciated that the present drive control system 10, can include a plurality 52 of controllers, drive motors 54, and encoders 56 in communication with one another, as deemed necessary in order to make the conveyor system 34 operate properly. Thus, the control system 10 is flexible and can be adopted for application in large-scale conveyance situations employing conveyor lines well in excess of 2,000 feet. By contrast fewer controllers and motors can be used and the system 10 automatically adjusts for same.

The sensing devices 32 send signals 58 to the PLC 16. The signals 58 carry data identifying the load transitions of a work piece on the conveyor 34, zone location of a particular work piece on the conveyor 34, and other information such as if a work piece carrier is running empty, etc.

Once the program 18 associated with the PLC converts the data indicative of work piece zone location and weight of the work piece, that new data is then conveyed 60 to the industrial computer 14. The dynamic chain pull calculation program 12 then interprets and processes that new data so as to ascertain actual load and position characteristics for each drive motor. That information in turn is then compared to the real time current speed and torque requirements of each individual drive motor 26, 28 and 30, in order to ascertain whether each is operating efficiently. In turn, signals 62 are generated from the industrial computer 14, to the PLC 16 and its program 18 which in turn segments the signal 62 into its constituent parts. In turn, signals 46, 48 and 50 are then generated by the PLC 16, to their corresponding controller 20, 22 and 24, that is indicative of how each motor 26, 28 and 30 should be performing. For example, it is found that slave motor 30 is lagging, which is when the torque output is not equal to the calculated torque demand, then PLC 16 would send a signal 50 to controller 24 that is indicative of the need to increase power to drive motor 30.

Thus, a dynamic drive control system 10 is operable so as to allow the overall system to dynamically adjust given current load characteristics on the conveyor system 34. Through the use of the dynamic chain pull calculation 12, constant information is sent via sensing devices 32, through PLC 16, which continuously monitors and updates, the current performance characteristics of the conveyor system 34 to the computer 14. In turn, feedback information via signal 62 automatically adjusts the performance of the motors 26, 28 and 30 to a desired level.

Figure 2:
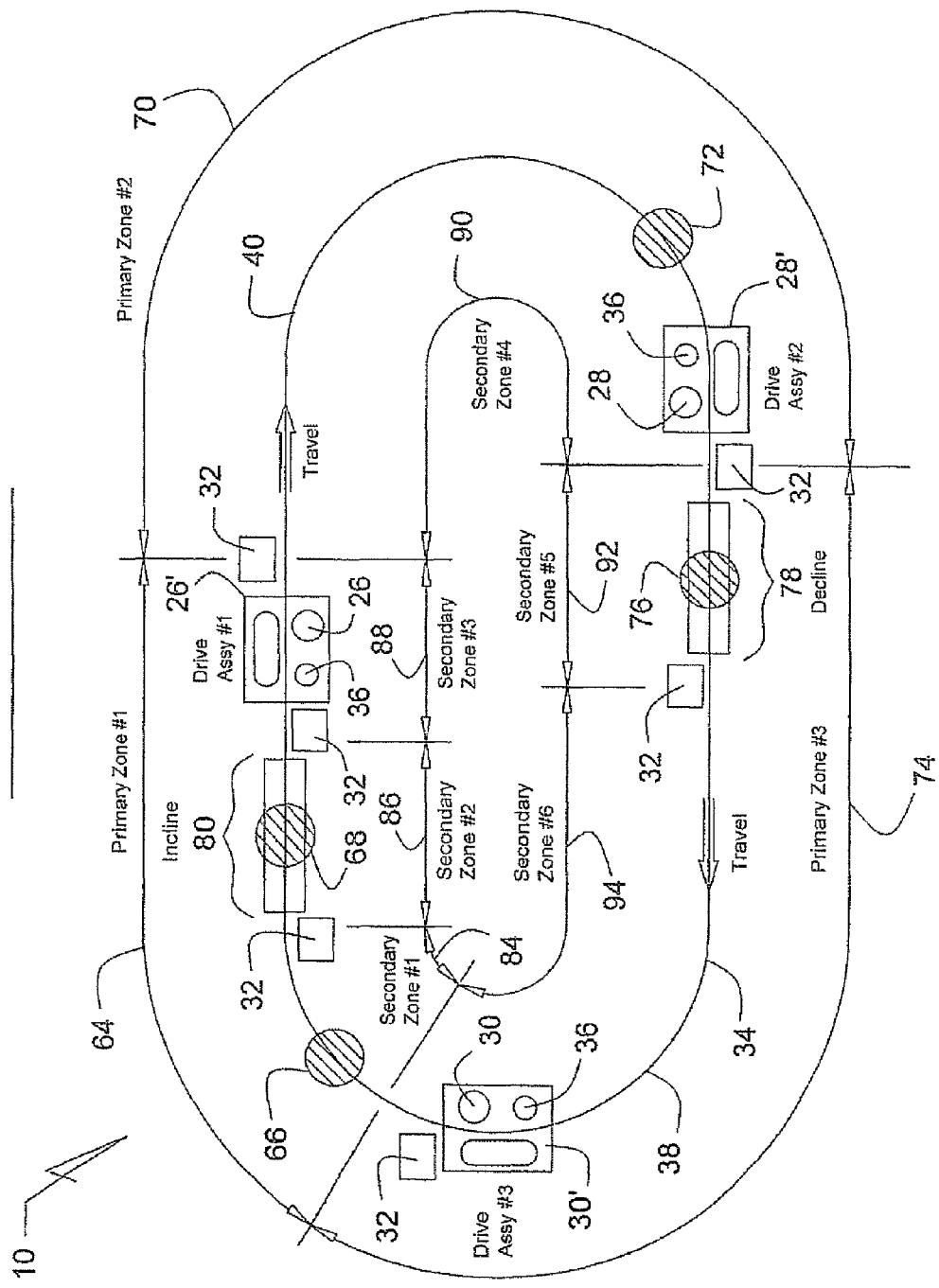
FIG. 2 is a plan view that schematically illustrates components of the drive control system.

With reference to FIG. 2, a schematic diagram is illustrated of the plan view of the novel conveyor system 10. The system 10 is divided into three primary zones 64, 70, and 74, the extent of which are defined, in part, by the drive assemblies 26, 28, and 30. Each primary zone consists of the chain path between the drive assemblies located at the head and tail of said zone. The drive assembly at the tail of any primary zone is by definition the head of the preceding zone. Typically, the loads 66, 68, 72, and 76 represent a single load in progressive positions as the load traverses the conveyor system. Encoders 36 are located at each drive assembly and may serve two functions. One function is to provide a speed feedback reference to the drive control system to maintain programmed and synchronized speed among all active drives. A second function is to provide a means to count passing chain links at each drive assembly. This information is used by the control system to maintain constant link counts necessary to assure the calculated chain slack in each succeeding primary zone. Within each zone, the system 10 via program 12 is programmed to include a target number of chain links for optimal performance. When the system 10 determines that the preset target number of links are not the same as the actual number of links in a given zone, then the dynamic control system 10 is intelligent and will automatically adjust, via drive controllers 20, 22 and 24, the speed of the corresponding motors 26, 28 and 30 so as to reconfigure the system so that the target number of links can be obtained so as to maximize optimal performance. By doing so, the stress upon the links within each given zone, is minimized and chain tension is relieved which will increase conveyor chain life and allow for the application of increased chain lengths for all similar systems.

First primary zone 64 includes the portion of the conveyor between first drive assembly 26' and third drive assembly 30. Sensors 32 are located at the entry and exit of each primary zone 64, 70, and 74 and are also located at the entry and exit of all other secondary zones 84, 86, 88, 90, 92 and 94 for the purpose of tracking the loads while within each zone. First primary zone 64 is shown with the master drive 26, its encoder 36, and sensing devices 32, located at the extremities of the zone. As the load 66, enters Primary Zone #1, its presence is detected by the first set of sensors 32 notifying the PLC 16 that the load has entered the area of the chain path under the control of first drive assembly 26' and has exited the control zone of drive assembly number 30'. The load transition is recognized by the computer 14 and the torque output of each drive is modified accordingly. As the same load 68, passes into the secondary zone 86 defined by the beginning of the inclined vertical bend 80, the industrial computer 14 recognizes that the load is now traversing up the incline. The torque demand on the first drive assembly 26' is increased based upon the lift angle and weight of the load as is recognized through preprogramming into the computer 14 and thus the torque is further increased to compensate for this demand. Note that the load weight and incline angle are pre-determined and calculated in the overall system chain pull calculation programmed in the computer 14. It should also be noted that a plurality of secondary zones 84, 86, 88, 90, 92, and 94, within the primary drive assembly zones may exist bounded by sensing devices to monitor general load locations within the specified zones as they traverse the conveyor system. In addition, it should be noted that a "load sensing" secondary zone may shift between the drive control purviews of succeeding primary drive zone controllers in some instances where overhauling load conditions exist (declines with drive assemblies upstream). For example, when a load is traversing down decline 78, it may be "held back" by the second drive assembly 28'. When there is no load on this decline 78, which is also secondary zone 92, this section of chain may be pulled by the third drive assembly 30' if conditions warrant.

A second primary zone 70 includes that portion of the conveyor system 34 having its own set of sensors 32, a third load position 72, slave motor 28 and an associated encoder 36. It will be appreciated that the sensors 32 can be of the proximity type or any other device that is commercially available and commonly used for these purposes on material handling systems. Other types of sensors may be employed as desired.

A third zone 74 is provided and it describes a fourth load position 76, sensors 32, and a slave drive motor 30 with its associated encoder 36. It will be appreciated that the conveyor system 34 can be broken down into as many zones as necessary to monitor and control the drive control system 10. The purpose of which is to provide segments of the conveyor system that employ its own motor and encoder which provides continuous feedback to the computing system of the drive control system 10. Such arrangement allows the constant monitoring of loads moving within and between secondary "load sensing" zones as well as monitoring the number of chain links within each zone so as to optimize performance. The PLC 16 and industrial computer 14 are operable to process the signals from the encoders so as to compare the targeted preferred number of chain links within a given zone, to the actual number of links within a given zone. In turn, the PLC 16 responds by adjusting the controllers 20, 22 and 24 respectively.

Figure 3:
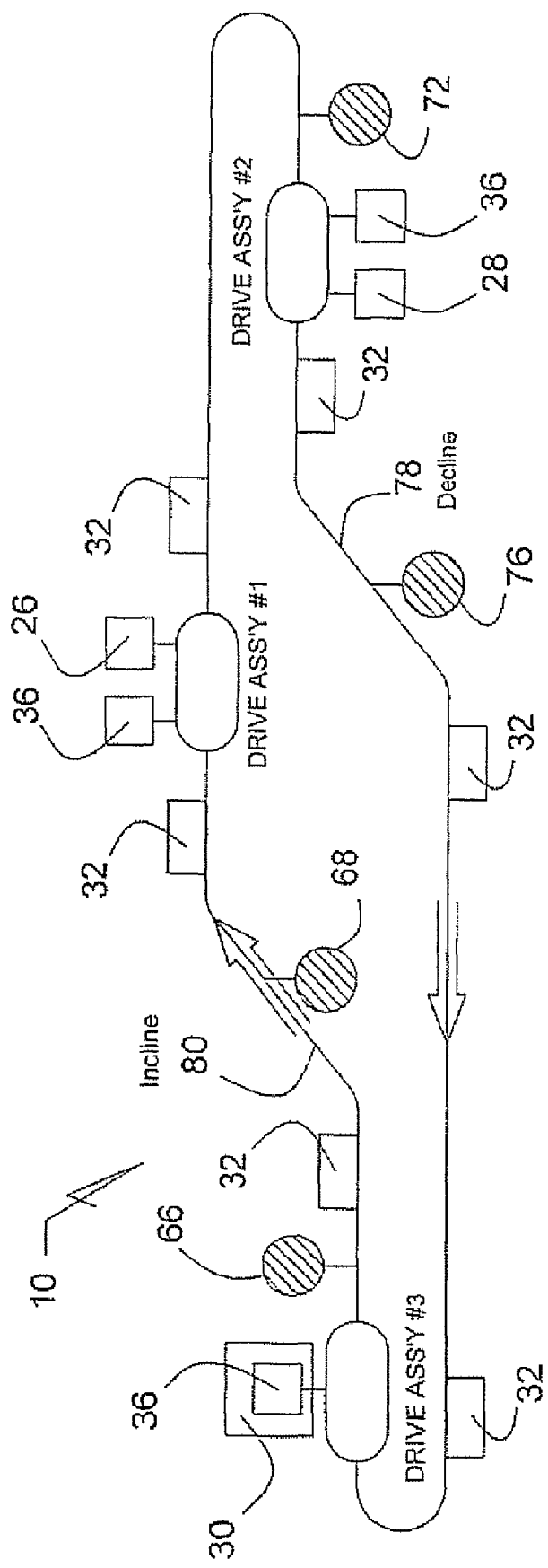
FIG. 3 is a schematic representation of a side view of the drive control system for a conveyor.

With reference to FIG. 3, a side elevation view of the schematic representation illustrating how a workload traverses through a plant is depicted. For example, drive motor 26 propels a load 66 along a flat, continuous path until it reaches an inclined vertical bend 80. When at position 68, the load is shown traveling up the incline 80, which generates increased torque demand on the conveyor system 34. In turn, drive motor 26 will automatically adjust to increase its torque output. This, in part, is done through the aid of a dynamic chain pull calculation program 12 which is capable of aiding the system in automatically adjusting to the overall system current torque needs.

Conversely, as the load 76 traverses back down a decline 78, the motors in the system will automatically adjust to accommodate same. It will be appreciated that the sensors 32 positioned around the conveyor line will automatically sense load transitions into and out of primary zones and various other defined secondary zones within each drive zone positions and their associated weights, with said data being then directed via signal 58 to the PLC 16 as shown in FIG. 1.

A description of the operation of the drive control system 10 will now be presented. With reference to FIGS. 1 and 2, one aspect of the preferred embodiment of the present invention includes one or more loads 66 being placed on a conveyor chain 40. It will be appreciated that the length of the chain can be in excess of 2,000 ft. because of the unique design herein. The conveyor system 34 can move a single load, or a plurality of loads throughout the system, at any given time. As load 66 traverses within the first primary zone 64, the sensor 32 will automatically detect its position. The control system will recognize this condition as well as the load weight thus sending a signal 44 to the PLC 16. That data is processed by the logic program 18 which in turn converts the information to a signal 60 which is then delivered to the industrial computer 14. The dynamic chain pull calculation program 12 in turn processes the real time signal 60 and makes a comparison to a preferred or bench mark performance indicia x. A delta will now be recognized indicating the difference between the actual performance and the preferred bench mark performance x. The dynamic chain pull calculation program 12 processes this condition and automatically adjusts performance of the system to make it closer to the bench mark performance level. This is accomplished by the industrial computer producing the signal 62 which is indicative of the drive torque requirements for the master drive motor 26, and for the other associated slave motors. The PLC 16 differentiates the signal 62 into select torque output requirements 46, 48 and 50 which in turn informs the controllers 20, 22 and 24 the desired torque levels. Drive motors 26, 28 and 30 in turn receive signals 82 commensurate with the desired performance automatically performed at the desired level. Thereafter, the drive motors impart motion to the drive chain 40 so that material advances throughout a plant in a smooth and consistent manner.

It will be appreciated that more than three controllers and motors can be slaved to the PLC 16. For example, a number up to "N" 52 can be integrated within the system and will allow for chain lengths of greater than 2,000 ft. It will also be appreciated that each associated controller 52 will have its own drive motor 54 and encoder 56 the combination of which become part of their own zone within the conveyor 34.

Through this unique conveyor drive control system 10, the drive motors 28, 30, or 54 can be removed for maintenance, or other purposes, while in operation and when this condition is detected the other associated motors within the system 10, will automatically adjust under dynamic conditions and increase their performance as to accommodate for the missing motor. Further, the master drive motor 26 could be taken out of service and one of the slave drive motors 28, 30, etc., could be designated, either manually or automatically, as the new master drive. Likewise, the former master drive 26 could be designated as a salve drive as desired when it is brought back into service. Thus, the drive control system is flexible in that salve and master motors can be interchanged and the computer 14 or PLC 16 may operate to control or effectuate said changes.

Another aspect of the operation of the present invention includes monitoring the number of chain links within a given zone as discussed above. This is accomplished by the associated encoders 36 counting the number of links 38 within the chain 40 as they traverse pass their associated motor. Prior to operation, the computer 14 will have been programmed to a predetermine desired number of links within each given zone. This creates the base line for which the computer to compare whether or not the target number of links are appropriate within a given zone. As the system operates, the data produced by the chain and carrier movement will be delivered to the computer 14 which will recognize any discrepancy and automatically adjust the signal 62 back to the PLC 16. The associated controllers 20, 22 and 24 will automatically adjust the speed of their associated drive motors so as to re-sync the system. The goal is to get back towards the target number of links within a given zone and produce a calculated level of slack chain. Such should reduce the stress on the links 38 within the chain 40 which in turn will increase longevity of the chain 40. This in turn reduces operating costs and enhances efficiency. It should be noted that the calculated level of slack chain would be a minimal amount such that subsequent chain telescoping would not cause the system to jam.

It should be noted that this invention is applicable to conveyor systems with single drive control units which may be utilized to carry or deliver loads of various different weights at different time periods. This data (load weight) may be manually or automatically input as the carrier is loaded and the torque control will automatically adjust to the torque demand as required.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. A drive control system for a conveyor comprising:
a conveyor device that is operable to move material via a flexible member along a single conveyor that is propelled by two or more motors in a load sharing drive control application;
a computer for processing data;
a dynamic mathematic model calculation program executed by said computer, said program being operable to continuously evaluate the torque requirements of the system and produce a signal responsive of actual torque demands;
a PLC operable to monitor and control all input and output devices associated with the conveyor;
a motor controller in communication with the PLC, said controller is operable to receive input data from the PLC and deliver torque and speed power outputs to a motor;
a motor operable to receive the torque and speed power outputs and provide power to a primary moving element of said system; and
a plurality of primary zones positioned about the conveyor, each said zone including a counting device near proximal ends of said zones for counting a number of segments of said flexible member.

2. The drive control system as claimed in claim 1, further comprising a sensing device that is operable to determine load data.

3. The drive control system as claimed in claim 1, wherein the conveyor is automatically adjusted to perform at different levels based on varying conditions within the system.

4. The drive control system as claimed in claim 1, further comprising at least one zone around a perimeter of the conveyor device, said zone including sensors for sensing load transitions into and out of specified control zones as required for accuracy defined by requirements of a dynamic mathematical calculation.

5. The drive control system as claimed in claim 1, further comprising a zone, said zone having a device for sensing the weight of loads should those weights not be pre-defined.

6. The drive control system as claimed in claim 1, wherein the computer continuously calculates actual torque requirements for each motor and produces a signal to the PLC indicative of torque needed.

7. A drive control system for a conveyor comprising:
a conveyor device that is operable to move material;
a computer for processing data;
a dynamic chain pull calculation software program executed by said computer, said program being operable to continuously evaluate the torque requirements of the system and produce a signal responsive of actual torque demands;
a PLC operable to monitor and control all input and output devices associated with the conveyor;
a motor controller in communication with the PLC, said controller is operable to receive input data from the PLC and deliver torque and speed output to a motor;
a motor operable to receive the torque and speed power outputs and provide power to a primary moving element of said system, and
an encoder that is operable to produce a signal that, when compared to similar signals produced by other encoders within the system, can be indicative of a number of links within a predetermined zone of the conveyor.

8. The drive control system as claimed in claim 1, further comprising a plurality of controllers that each communicate with their own drive motor, each drive motor responds in accordance with an output from the dynamic chain pull calculation program.

9. The drive control system as claimed in claim 8, wherein the PLC provides an output to a drive controller, said output varies in accordance with dynamic run conditions of the conveyor device.

10. The drive control system as claimed in claim 1, wherein said system continuously monitors the current load locations on the conveyor system and the motor controller adjusts torque output requirements.

11. A drive control system for a conveyor comprising:
one or more variable speed motors for driving a flexible member;
a dynamic flexible member calculation program that continuously interprets torque requirements for each motor in the system, said program operable to process a real time signal and compare said signal to a preferred performance indicia;
one or more sensors operable to create a signal indicative of a load position and weight and send data to a PLC;
a PLC that converts the data from said sensors and transmits said real time signal to a computer processing the dynamic flexible member calculation program;
a device for determining a value of lengths within a given segment of the flexible member;
a computer operable to process the real time signal from the PLC using the dynamic flexible member calculation program and generates drive torque data for each motor; and
a motor controller operable to control each variable speed motor so that proper torque is generated by each motor as needed.

12. A drive control system for a conveyor comprising:
at least one motor for driving a conveyor device;
a dynamic chain pull calculation program that continuously interprets torque requirements for each motor in the system;
one or more sensors operable to create a signal indicative of a load position and weight and send data to a PLC;
a PLC that converts the data from said sensor and transmits a signal to a computer processing the dynamic chain pull calculation program;
a computer operable to process the signal from the PLC using the dynamic chain pull calculation program and generates drive torque and speed power outputs for each motor;
a motor controller operable to control each motor so that proper torque is generated by each motor as needed; and
at least one encoder in communication with said PLC, said encoder is operable to measure a number of link segments that pass through each drive assembly over time as well as operating as a speed feedback reference device.

13. The drive control system as claimed in claim 11, further comprising a conveyor that moves material.

14. The drive control system as claimed in claim 11, wherein one of the drive motors is a master drive motor and its speed is set at a constant rate, another drive motor is a slave drive and its speed adjusts to maintain chain link positioning and relative drive speed control.

15. The drive control system as claimed in claim 11, wherein said variable speed motors include master and slave motors, the master motor operates at a constant rate and the slave motor adjusts so as to maintain synchronized speed with the master motor.

16. A drive control system comprising:
a computer for processing data;
a dynamic calculation software program executed by said computer, said program being operable to continuously evaluate the torque requirements of the system and produce a signal responsive of actual torque demands;
a PLC operable to monitor and control all input and output devices associated with a machine;
a motor controller in communication with the PLC, said controller is operable to receive input data from the PLC and deliver torque and speed power outputs to a motor;
a motor operable to receive the torque and speed power outputs and provide power to a primary moving element of the machine, said moving element is operable to impart motion to a flexible member that is driven by said motor; and
a plurality of primary zones positioned about the machine, each said zone including a counting device near proximal ends of said zones, said counting device is operable to determine segments of the flexible moving member,
said computer being operable to received load information and then with the aid of the dynamic calculation software program calculate a base line torque requirement for a motor in the drive control system.

17. A drive control system comprising:
a computer for processing data;
a dynamic chain pull calculation software program executed by said computer, said program being operable to continuously evaluate the torque requirements of the system and produce a signal responsive of actual torque demands;
a PLC operable to monitor and control all input and output devices associated with a machine;
a motor controller in communication with the PLC, said controller is operable to receive input data from the PLC and deliver torque and speed power outputs to a motor;
a motor operable to receive the torque and speed power outputs and provide power to a primary moving element of the machine;

a plurality of primary zones positioned about the machine, each said zone including a counting device near proximal ends of said zones, and
secondary zones and a device for counting a number of chain links within each secondary zone.

18. The drive control system as claimed in claim 16, wherein the machine is a conveyor, said drive control system is operable to adjust torque requirements based on changing dynamics of the system.

19. The drive control system as claimed in claim 16, wherein the system is operable to move a load along a path defined by a plurality of secondary zones, each said secondary zone comprising a sensor for measuring the position of the load, said sensor being operable to communicate with said PLC.

20. A method of operating a drive control system for a conveyor comprising:
   a. providing a conveyor device, motor and a control system;
   b. inputting predetermined load information and calculating a base line torque requirement for each motor in the system;
   c. sensing dynamic load conditions on the conveyor and creating signals;
   d. sending signals to a computer that operates a dynamic chain pull calculation program;
   e. processing said signals with said program in order to adjust torque requirements for each motor; and
   f. counting the number of links in a conveyor chain and adjusting one of said motors as determined by the program.

21. A method of operating a drive control system for a conveyor having a series of motors in a load sharing application, the method comprising:
   a. providing a conveyor device, motor and a control system;
   b. inputting predetermined load information and calculating a base line torque requirement for each motor in the system;
   c. sensing dynamic load conditions on the conveyor and creating signals;
   d. sending signals to a PLC that operates a dynamic chain pull calculation program;
   e. processing said signals with said program in order to adjust torque requirements for each motor; and
   f. counting the number of links in a conveyor chain and adjusting all of said motors as determined by the program.

* * * * *